United States Patent [19]

Yoshida, deceased

[11] Patent Number: 4,762,514
[45] Date of Patent: Aug. 9, 1988

[54] METHOD OF MAKING BEVERAGE PACKAGING BAG

[75] Inventor: Tokio Yoshida, deceased, late of Kanagawa, Japan, by Makiko Yoshida, administrator

[73] Assignee: Fujimori Kogyo Co., Ltd., Japan

[21] Appl. No.: 85,261

[22] Filed: Aug. 12, 1987

Related U.S. Application Data

[63] Continuation of Ser. No. 794,143, Nov. 1, 1985, abandoned, which is a continuation-in-part of Ser. No. 625,300, Jun. 27, 1984, abandoned.

[51] Int. Cl.$^4$ ............................................. B31B 1/14
[52] U.S. Cl. .................................... 493/227; 493/199; 493/201; 493/341; 493/369; 219/121.67; 219/121.69; 383/66
[58] Field of Search ............... 493/194, 195, 196, 199, 493/200, 201, 212, 227, 341, 923, 933, 369; 219/121 LG, 121 LH, 121 LJ, 121 LK, 121 LL, 121 LN; 156/272.8, 380.9; 383/66

[56] References Cited

U.S. PATENT DOCUMENTS

| 3,006,257 | 10/1961 | Orsini | 383/120 X |
| 3,524,566 | 8/1970 | Parks | 229/7 S |
| 3,582,466 | 6/1971 | Quirk | 219/121 LG |
| 3,981,230 | 9/1976 | Lee | 493/196 |
| 3,986,640 | 10/1976 | Redmond | 206/634 |
| 4,032,861 | 6/1977 | Rothrock | 219/121 LH |
| 4,072,233 | 2/1978 | Kramer et al. | 206/634 X |
| 4,268,346 | 5/1981 | Achelpohl | 493/194 |
| 4,430,548 | 2/1984 | Macken | 219/121 LG |

Primary Examiner—Frederick R. Schmidt
Assistant Examiner—Robert L. Showalter
Attorney, Agent, or Firm—Wegner & Bretschneider

[57] ABSTRACT

A method of making a beverage packaging bag made of at least one laminar panel which has an inner layer and an outer layer with appropriate portions of the laminar panel bonded and thus sealed together by heating and a plurality of cuts provided in the outer layer to facilitate piercing of a straw through the panel, by directing a laser beam through a mask at the bag.

9 Claims, 2 Drawing Sheets

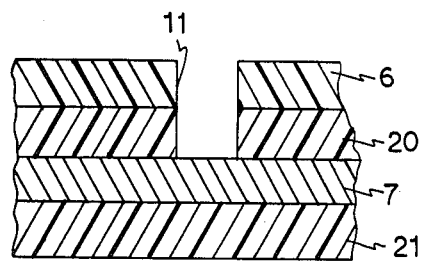
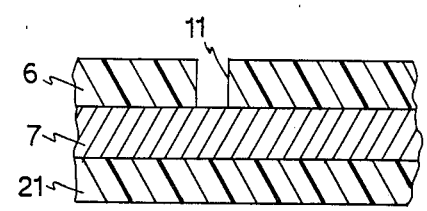
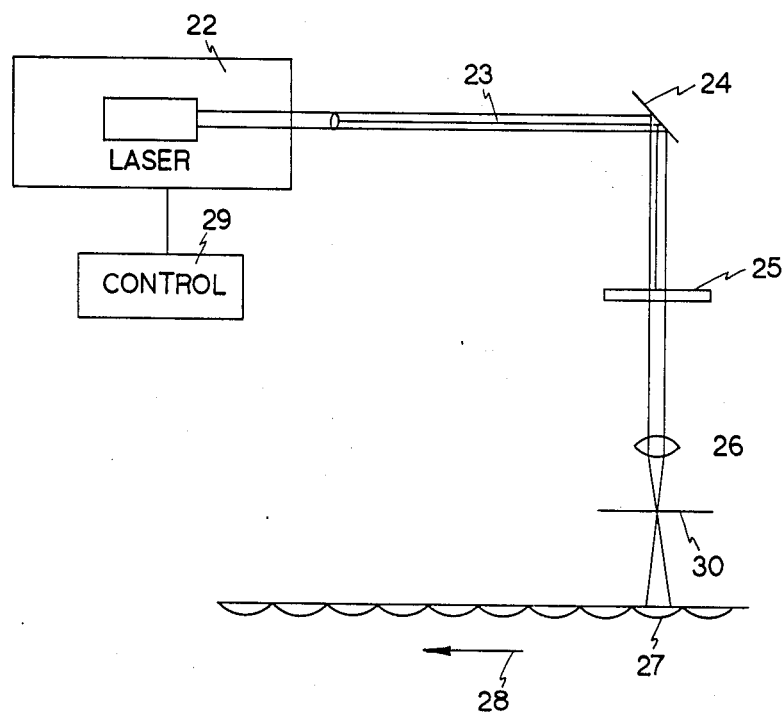

METHOD OF MAKING BEVERAGE PACKAGING BAG

CROSS-REFERENCE TO RELATED APPLICATION

This application is a continuation of application Ser. No. 794,143, filed Nov. 1, 1985, now abandoned, which is a continuation-in-part of application Ser. No. 625,300, filed June 27, 1984, now abandoned.

FIELD OF THE INVENTION

The present invention relates to a method of making a beverage packaging bag comprising laminar panels capable of being readily pierced by a straw.

BACKGROUND OF THE INVENTION

A known prior art packaging bag for beverages such as juice, coffee, and soybean milk, is provided with means for facilitating piercing a straw into the packaging bag, which means consists of embossments only formed on the outside of the bag. Piercing of a straw through the embossments may be easily done when the bag panels are relatively thin. However, the panel thickness is commonly made thicker in order to maintain the quality of the contents for a longer period, and to more effectively prevent rupture of the bag. Easy piercing by an ordinary straw is not possible with such a thick-panelled packaging bag, particularly when the laminar panels of the bag comprise a combination of polyester film, biaxially stretched polypropylene film, nylon film, cellophane, or aluminum foil.

A typical prior art beverage packaging bag is taught in Orsini U.S. Pat. No. 3,006,257. The Orsini Patent teaches a method of making a bag of a thermo-weldable material but is not concerned with making a bag that can be readily pierced by a straw. Parks U.S. Pat. No. 3,524,566 is concerned with a rigid lid for a disposable drinking cup, the lid having a weakened area for insertion of a straw. Centrally located on the lid is a domed portion having a score around the top thereby forming a weakened area which can be pushed in by a straw. This, however, is quite different from a bag or flexible pouch which can be pierced by a straw. The lid is rigid while the bag with which the present invention is concerned is flexible. The lid is placed on a drinking cup after the cup is filled and is used immediately thereafter. Thus, it is not necessary to make it in such a way that it can withstand normal handling during automatic packaging operations, shipping to a point of sale, and being handled by the consumer.

Kramer et al. U.S. Pat. No. 4,072,233 is concerned with a flexible container having a frangible piercing point. The frangible, or weakened, area is made by cutting, stamping, or the like to form a depression part way through the wall of the bag, the wall commonly being a multi-layered laminate. The disadvantage of forming the weakened area by mechanical means is that the depth of the weakened area cannot be accurately controlled and a weakening beyond the desired depth often occurs.

SUMMARY OF THE INVENTION

It is, therefore, a primary object of the present invention to provide a method of making a beverage packaging bag with an area that can be readily pierced by a straw.

Another object of the present invention is to provide a method of making a beverage packaging bag which permits easy penetration of a straw into the bag through a cut provided in an outer film of the bag panels, thereby permitting the contents to be sipped through the straw.

In order to achieve the above objects, the packaging bag which comprises a single panel folded into two overlapping panel segments, or two individual panels overlapping each other, the panel or panels comprising an inner layer having on its inside a thermoadhesive synthetic resin film, and another reinforcing layer laminated on the inner layer, the panel segments or individual panels being bonded together and thus sealed by heating them along their edge portions, is provided with a number of cuts in a portion of the reinforcing outer layer by means of a laser which is directed at the bag through a mask having the desired pattern.

Such beverage packaging bag is air-tight, damp-proof, and light-proof, so that it is capable of preventing deterioration of the contents due to aroma dissipation or oxidation of the contents which may be a beverage such as juice, coffee, or soybean milk. The reinforcing outer layer provides a high strength, particularly against piercing, which will serve to prevent the bag from being pierced by a sharp edge of another bag, for example, thus preventing leakage of the contents. Meanwhile, since the cuts provided in the outer reinforcing layer will not withstand tensile forces, the cuts in the outer layer may be readily opened and the inner layer may be readily pierced with a straw inserted into the opened one of the cuts.

The inner layer underlying the cuts will prevent leakage of the contents through the cuts until pierced.

Embossments may be provided around the cuts in the outer layer, which will serve to prevent slipping of the straw tip on the embossments, thus further facilitating piercing of the straw.

BRIEF DESCRIPTION OF THE DRAWINGS

The present invention will now be described, by way of example, with reference to the accompanying drawings, in which:

FIG. 10 is a partial enlarged cross-sectional view of typical laminar panels of typical sheet material; and FIG. 11 is a schematic view of the apparatus used to make the cuts according to the invention.

DESCRIPTION OF THE PREFERRED EMBODIMENTS

Figure 1:
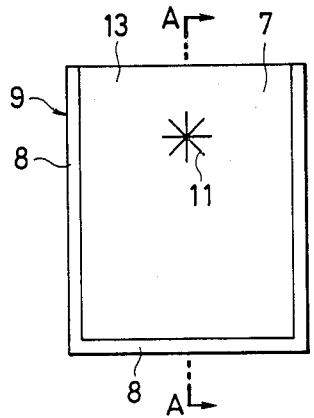
FIG. 1 is a plan view of a first embodiment of the beverage packaging bag.
Figure 2:
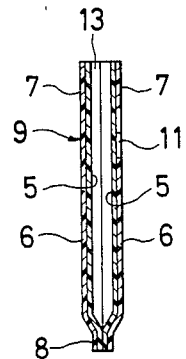
FIG. 2 is a cross-sectional view of the bag of FIG. 1, taken along lines A—A of FIG. 1.
Figure 3:
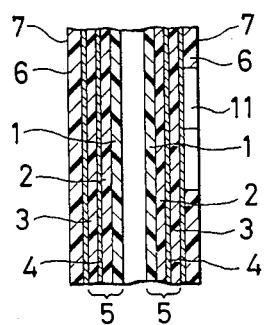
FIG. 3 is a partial enlarged cross-sectional view of the bag of FIG. 1, taken along the lines of A—A.

Before discussing the method of the invention, the end product, that is the bag, will be described. Referring now to FIGS. 1 to 3, a first embodiment of the bag comprises a single laminar panel folded into two segments overlapping each other, or a pair of individual laminar panels 7 bonded together, as shown. Each panel 7 comprises an inner layer 5 which consists of: an inner film 1, 10 to 120$\mu$ thick, of a thermoadhesive synthetic resin such as polyethylene or polypropylene, and first and second heat-resistant, air-tight, and light-proof base material films 2 and 3, respectively. The first base material film 2 is a stretched polyethylene or polypropylene film, 10 to 120$\mu$ thick, and the second base material film 3 is an aluminum film 7 to 25$\mu$ thick. These films 1, 2, and 3 are bonded together by an adhesive or hot-extruded polyethylene film 4.

An outer reinforcing layer 6, 12 to 50$\mu$ thick, is bonded over the inner layer 5 by the same means as above. The outer layer 6 has a high piercing strength and a high rigidity, and consists of a polyester film, biaxially stretched polypropylene film, a nylon film, or a cellophane, or a combination of two or more of these films.

The folded panel segments or individual panels 7 are bonded together and thus sealed by heating them along their edge portions 8, to form the bag 9 as shown.

One of the panel segments or panels 7 is provided with a plurality of radially extending linear cuts 11 which are 2 to 20 mm, preferably about 5 mm long. The cuts are formed in a portion of the reinforcing outer layer 6 of the panel 7 by the method of the present invention, this portion being above the surface of the contents in the bag when the bag is erected, before the inner and outer layers 5 and 6 are bonded together by the previously mentioned means. The mouth 13 of the bag 9 is hermetically closed after the bag is charged with the contents.

The bag 9 thus constructed permits easy piercing of a straw through the panel. That is, a straw will be applied generally vertically to the bag panel 7 at the intersection of the linear cuts 11, and is pushed. Since the cuts cannot withstand tensile forces, the cut 11 of the outer reinforcing layer 6 to which the straw is applied is readily opened by the straw tip; the straw will then easily pierce the inner layer 5 beneath the outer reinforcing layer 6.

The straw may also be applied obliquely to the bag panel 7 at the portion where the cuts 11 are formed. Then, even if the straw tip is not applied to the intersection of the cuts 11, the straw may be generally perpendicular to any one of the cuts 11, so that it is possible to open the cut and then easily pierce the inner layer 5. Thus, the straw may be applied in any direction.

The cuts 11 may be provided on both of the panel segments or panels 7.

Figure 4:
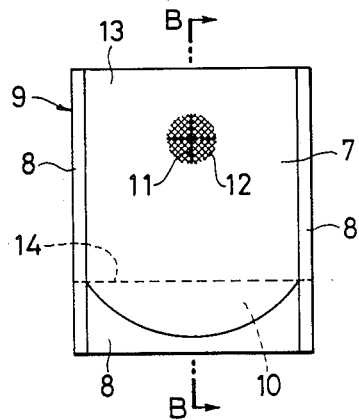
FIG. 4 is a plan view of a second embodiment of the beverage packaging bag.
Figure 5:
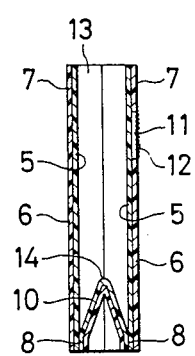
FIG. 5 is a cross-sectional view of the bag of FIG. 4, taken along lines B—B of FIG. 4.

FIGS. 4 and 5 show a second embodiment of the bag. This bag 9 comprises a pair of side panels 7, and a bottom panel 10. The bottom panel 10 is inserted between the side panels 7, folded into a V with its fold 14 inside. These panels 7 and 10 are all of the same laminar construction as the panels previously described with reference to FIGS. 1 to 3, and are similarly bonded together along appropriate lines 8 by heating them to form a self-supported beverage packaging bag 9.

The outer reinforcing layer 6 of one of the side panels 7 is provided with linear cuts 11 crossing together, which are 2 to 20, preferably about 10 mm long. The cuts 11 are made by the method of this invention. Around the crossing cuts 11 there are formed embossments 12. The embossments 12 may be formed by various means, such as cold or hot pressing using a die formed with continuous small projections. The hot press provides sharply formed embossments 12, which will more effectively prevent slipping of the straw tip on the embossments, thus facilitating piercing of the straw.

In this embodiment, similarly referenced parts are similarly constructed with the embodiment of FIGS. 1 to 3. And this embodiment has similar merits. A straw may be readily and securely inserted in to the bag through the cut 11 without slipping.

Figure 6:
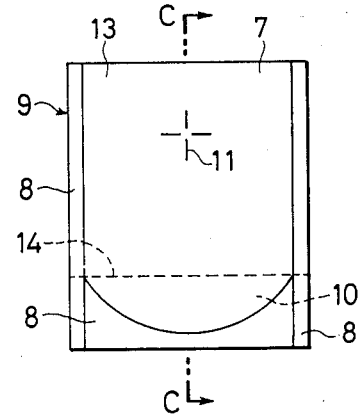
FIG. 6 is a plan view of a third embodiment of the beverage packaging bag.
Figure 7:
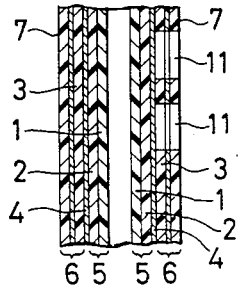
FIG. 7 is a partial enlarged cross-sectional view of the bag of FIG. 6, taken along lines C—C of FIG. 6.

In FIGS. 6 and 7 there is shown a third embodiment of the bag. This embodiment 9 comprises a pair of side panels 7, and a bottom panel 10. The bottom panel 10 is inserted between the side panels 7, folded into a V with its fold 14 inside. These panels 7 and 10 are all of the same laminar construction as the panels previously described, and are similarly bonded together along appropriate lines 8 by heating them to form a self-supported beverage packaging bag 9.

The outer reinforcing layer 6, which consists of two sublayers, one of the side panels 7 is provided with radially extending cuts 11, made according to this invention, which do not intersect with one another, and are 2 to 20, preferably about 10 mm long.

After the cuts 11 are formed, the outer reinforcing layer 6 is laminated or bonded over the inner layer 5. Then, undesirable wrinkles or turnups will not form on the outer reinforcing layer 6 around the cuts 11, since the layer 6 has no cut portions having free ends.

In this embodiment, similarly referenced parts are similarly constructed with the foregoing embodiments. And this embodiment has similar merits. A straw may be readily and securely inserted into the bag through the cut 11.

The cuts 11 may be provided in both of the side panels 7.

Figure 8:
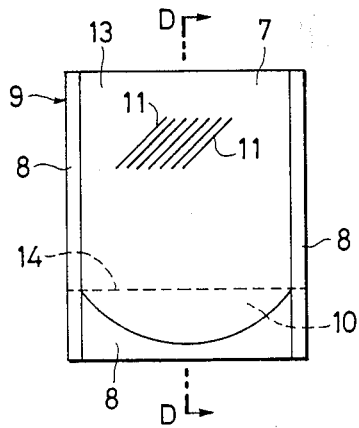
FIG. 8 is a plan view of a fourth embodiment of the beverage packaging bag.
Figure 9:
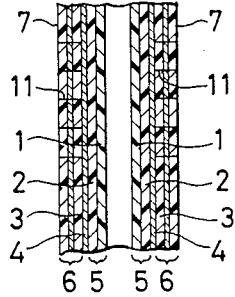
FIG. 9 is a partial enlarged cross-sectional view of the bag of FIG. 8, taken along lines D—D of FIG. 8.

In FIGS. 8 and 9 there is shown a fourth embodiment of the bag. The self-supported packaging bag 9 of these Figures is generally of similar construction to the packaging bag of FIGS. 6 and 7. The outer reinforcing layer 6, which consists of two sublayers, of each side panel 7 is provided with a plurality of neighboring parallel cuts 11 made according to the invention which are 2 to 20, preferably about 10 mm long. A straw may easily and securely open either cut and pierce the inner layer 5, when applied perpendicularly to either panel 7, or applied obliquely to the panel 7 but perpendicularly to the cut 11, and forced in the cut 11.

In this embodiment, similarly referenced parts are similarly constructed with the foregoing embodiments. And this embodiment has similar merits. A straw may be easily and securely inserted into the packaging bag through either cut 11 in either side panel.

The cuts may be provided only in either one of the side panels 7.

The arrangement of the cuts 11 may be other than those as shown in the accompanying drawings. For example, the cuts may be provided in the form of a Y, an X, two parallel lines crossed by a single line at any desired angle, etc.

Having an understanding of the construction of the bag, reference is now directed to FIGS. 10 and 11 which will assist in an understanding of the method of the instant invention. FIG. 10A shows a typical laminate having an outer layer 6, for example, a polyester film which is polyethylene terephthalate, a second nylon layer 20, an aluminum layer 17, and an inner cast polypropylene layer 21. In this particular example, a cut 11 was made through the two upper layers 6 and 20. FIG. 10B shows a three-layer laminate comprising an upper polyester layer 6 which is about $12\mu$ thick followed by an aluminum layer 17 which is about $12\mu$ thick and a polyethylene film layer 21 which is about $100\mu$ thick. A slit 11 is cut through the outer layer 6 only.

According to the present invention, the slits 11, regardless of the confirguration thereof, are made by means of a laser. FIG. 11 schematically shows a laser device 22 which emits a laser beam 23. Laser beam 23 is directed by a mirror 24 through a mask 25 and lens 26 onto the surface of a bag 27 moving, on a typical conveyor system, in the direction of arrow 28. The laser is controlled by control means 29.

Mask 25 is fabricated of copper, bronze, or any other suitable material, by cutting, punching, or the like. The desired shape of the slit 11 as shown in FIGS. 1, 4, 6, and 11, for example, is cut into the mask. The laser 22 is a commercially available laser, typically a $Co_2$ gas laser using a mixture of helium and nitrogen as the gas and operating by pulse oscillation. The output power applied is approximately 3 joules±0.5, i.e., 3–9 volts which can be freely controlled by use of a known control system 29.

When the laser beam 23 is directed through mask 25, the pattern dictated by the mask is transmitted toward a bag 27. The, thus modified, beam 23 passes through lens 26, crossing the focal plane 30 of lens 26 and striking bag 27. By moving lens 26, the width of the beam striking bag 27 can be adjusted to provide a cut the desired size. The depth of the cut, of course, is regulated by regulating the power of the laser as is well-known in the laser art.

The bags continuously move along a conveyor system and the cuts 11 are made using the laser system at high speed with great accuracy.

It should be apparent from the foregoing detailed description that the objects set forth at the outset to the specification have been successfully achieved. Moreover, while there is shown and described present preferred embodiments of the invention, it is to be distinctly understood that the invention is not limited thereto but may be otherwise variously embodied and practiced within the scope of the following claims.

What is claimed is:

1. A method of making a beverage packaging bag comprising at least one laminar thermo-adhesive panel having an inner layer, wherein at least a portion thereof is made of aluminum, and an outer layer, appropriate portions of said laminar panel being bonded and sealed by heating, wherein said outer layer of said laminar thermo-adhesive panel is provided with a plurality of cuts in a predetermined pattern and to a predetermined depth and width, said method, comprising the steps of:
   (a) forming said cuts by providing a laser emitting a beam;
   (b) directing said beam toward said bag;
   (c) interposing a mask having said predetermined pattern therein in said beam;
   (d) focusing said beam onto said outer layer;
   (e) regulating said mask such that said beam penetrates said outer layer only to said predetermined width; and thereafter
   (f) regulating said laser such that said beam penetrates said laminar panel completely through said outer layer and up to said aluminum portion of said inner layer.

2. A method according to claim 1, further comprising the step of moving a plurality of said bags on a conveyor and directing said beam thereto.

3. A method according to claim 1, further comprising the step of forming embossments around said cuts.

4. A method according to claim 1, wherein said panel has at least two layers and said cuts are made to a depth equal to the thickness of the outermost of said layers.

5. A method according to claim 1, wherein said predetermined pattern is in the form of a plurality of intersecting radial lines.

6. A method according to claim 5, wherein said predetermined pattern is in the form of a plurality of non-intersecting radial lines.

7. A method according to claim 5, wherein said predetermined pattern is in the form of a plurality of parallel lines.

8. A method according to claim 7, wherein said predetermined pattern is intersected by a single line.

9. A method according to claim 5, wherein said predetermined pattern is in the form of an X.

* * * * *